US005643969A

United States Patent [19]

Sakamoto et al.

[11] Patent Number: 5,643,969
[45] Date of Patent: Jul. 1, 1997

[54] EXPANDABLE RESIN COMPOSITION

[75] Inventors: Toshio Sakamoto; Tatsuhiko Inoue; Mamoru Yoshida, all of Kanagawa-ken, Japan

[73] Assignee: Nippon Unicar Company Limited, Tokyo, Japan

[21] Appl. No.: 678,777

[22] Filed: Jul. 11, 1996

[30] Foreign Application Priority Data

Aug. 11, 1995 [JP] Japan ................................ 7-226118

[51] Int. Cl.$^6$ .................... C08J 9/10; C08J 9/12
[52] U.S. Cl. ................ 521/81; 264/50; 264/54; 521/79; 521/134
[58] Field of Search .................. 521/81, 134, 79; 264/50, 54

[56] References Cited

U.S. PATENT DOCUMENTS

| | | | |
|---|---|---|---|
| 5,180,754 | 1/1993 | Morita et al. | 521/85 |
| 5,346,926 | 9/1994 | Sakamoto et al. | 521/81 |

*Primary Examiner*—Morton Foelak
*Attorney, Agent, or Firm*—Saul R. Bresch

[57] ABSTRACT

A process for preparing an expandable resin composition comprising the following steps:

(a) admixing, at a temperature in the range of about 120 to about 130 degrees C., the following components:

(i) 100 parts by weight of a high pressure, low density homopolymer of ethylene;

(ii) about 30 to about 200 parts by weight of a high density polyethylene having a melting point higher than the above mixing temperature;

(iii) about 2 to about 50 parts by weight of polypropylene having a DSC melting point of not less than about 140 degrees C.; and (iv) about 0.1 to about 2 parts by weight of a silane coupling agent; and (b) admixing, at a temperature in the range of about 120 to about 130 degrees C., 100 parts by weight of the mixture produced in step (a) with 0.5 to 3 parts by weight of one or more chemical blowing agents having a decomposition temperature higher than the above mixing temperature.

7 Claims, No Drawings

EXPANDABLE RESIN COMPOSITION

TECHNICAL FIELD

This invention relates to processes for preparing (i) an expandable resin composition and (ii) a cable containing an expanded layer of the composition.

BACKGROUND INFORMATION

In the technology of insulated wires, especially coaxial cables for high-frequency signal transmission, improvements by way of enhancing the expansion of cellular (or foamed) insulation are desirable in order to decrease leakage attenuation and clarify image and sound.

A typical cable is constructed of metal conductors insulated with a polymeric material. These insulated conductors are generally twisted to form a core and are protected by another polymeric sheath or jacket material. In certain cases, added protection is afforded by inserting a wrap between the core and the sheath. In fiber optics cable, glass fibers are used instead of metal conductors, but a protective sheath is still necessary.

The general practice for producing cable insulated with expanded cellular (or foamed) coatings is to use an expansion or blowing process, which relies on chemical or gaseous blowing agents.

A chemical blowing process comprises the following steps: a chemical blowing agent is blended with a resin component at a temperature below the decomposition temperature of the blowing agent; the blended material is fed to an extruder for coating onto a conductor at a temperature above the decomposition temperature of the blowing agent; and the coated layer is subsequently allowed to expand in air and solidify using a coolant such as water. Chemical blowing processes are prevalent to a certain extent because the required investment is lower and the operation is simpler than gas blowing processes in spite of the smaller expansion and lower mechanical strength than is the case with gas blowing processes.

The extent of expansion by a chemical blowing process is, at most, 70 percent by volume. In addition, current processes use high pressure low density polyethylene (HP-LDPE). The expanded products of these processes do not have enough mechanical strength and are unsatisfactory for producing coaxial cables of high quality.

On the other hand, gas blowing processes use, in place of a chemical blowing agent, a chlorofluorocarbon gas such as monofluorotrichlormethane, difluorodichloromethane, trifluorotrichloroethane, and tetrafluorodichloroethane to easily obtain highly expanded products of 80 percent (by volume) expansion or more. Since these processes utilize high density polyethylene, enough mechanical strength is provided to produce coaxial cables of high quality. Chlorofluorocarbon gases, however, because of their negative effect on the ozone layer, are being phased out. Inert gases such as nitrogen, argon, and carbon dioxide have been proposed as alternatives to the chlorofluorocarbon gases. Attempts to substitute nitrogen for the chlorofluorocarbons, however, have resulted in expanded products, which do not have a uniform and fine cell structure. These expanded products are not commercially satisfactory.

DISCLOSURE OF THE INVENTION

An object of this invention, therefore, is to provide processes for preparing an expandable resin composition and a cable containing an expanded layer of said composition utilizing an inert gas blowing agent wherein the expanded layer is characterized by an expansion of at least about 70 percent by volume; a uniform and fine cell structure; and excellent mechanical strength.

According to the present invention, the object is met by the following embodiments of the invention.

The first embodiment is a process for preparing an expandable resin composition comprising the following steps:

(a) admixing, at a temperature in the range of about 120 to about 130 degrees C., the following components:
  (i) 100 parts by weight of a high pressure, low density homopolymer of ethylene;
  (ii) about 30 to about 200 parts by weight of a high density polyethylene having a melting point higher than the above mixing temperature;
  (iii) about 2 to about 50 parts by weight of polypropylene having a DSC melting point of not less than about 140 degrees C.; and
  (iv) about 0.1 to about 2 parts by weight of a silane coupling agent; and (b) admixing, at a temperature in the range of about 120 to about 130 degrees C., 100 parts by weight of the mixture produced in step (a) with 0.5 to 3 parts by weight of one or more chemical blowing agents having a decomposition temperature higher than the above mixing temperature.

The second embodiment is a process for preparing a cable comprising the following steps:

(a) introducing into an extruder, adapted for expanding a resin, 100 parts by weight of the expandable resin composition prepared in the above process;

(b) introducing into said extruder one electrical conductor or communications medium or a core of two or more electrical conductors or communications media;

(c) introducing into said extruder about 0.01 to about 2 parts by weight of an inert gas; and (d) extruding the expandable resin composition of step (a) around the conductor, medium, or core of step (b) at a temperature above the decomposition temperature of the chemical blowing agent(s) wherein the resin composition of step (a) expands at least about 70 percent by volume to provide an expanded layer around the conductor, medium, or core of step (b).

DESCRIPTION OF THE PREFERRED EMBODIMENTS(S)

Component (i) is a conventional high pressure, low density polyethylene, usually a homopolymer of ethylene, prepared, for example, by the high pressure process described in Introduction to Polymer Chemistry, Stille, Wiley and Sons, New York, 1962, at pages 149 to 151, or other conventional high pressure processes. The density of the homopolymer can be in the range of 0.915 to 0.930 gram per cubic centimeter, and is preferably in the range of 0.920 to 0.928 gram per cubic centimeter. The melt index can be in the range of about 1 to about 10 grams per 10 minutes, and is preferably in the range of about 1 to about 5 grams per 10 minutes. Melt index is determined in accordance with ASTM D-1238, Condition E, measured at 190 degrees C. The polymer has a high melt tension at about 130 to about 200 degrees C. It is also highly branched with a good deal of long chain branching. The melting point can be as low as about 103 degrees.

Component (ii) is a conventional high density polyethylene having a melting point higher than the aforementioned mixing temperature, which is about 120 to about 130 degrees C. The melting point is the DSC melting point, which is the melting point determined by measuring the latent heat of fusion by using a differential scanning calorimeter (DSC). The DSC melting point of the high density polyethylene can be about 130 degrees or higher. The high density polyethylene can be a homopolymer or a copolymer of ethylene and propylene, 1-butene, 1-hexene, 4-methyl-1-pentene, or 1-octene, and can be produced using a chromium based catalyst system, a magnesium-titanium based catalyst system, a vanadium based catalyst system, a single site metallocene based catalyst system, or other transition metal based catalyst systems. It can have a density of 0.945 to 0.961 gram per cubic centimeter and a melt index of about 15 to about 20 grams per 10 minutes.

Component (iii) is a conventional polypropylene. It can be a homopolymer or a copolymer of propylene and ethylene, 1-butene, 1-hexene, 4-methyl-1-pentene, or 1-octene wherein the propylene is present in an amount of at least about 60 percent by weight, and can be produced using catalysts similar to those used for the preparation of polyethylene, usually those utilizing inside and outside electron donors. See, for example, U.S. Pat. Nos. 4,414,132 and 5,093,415. The polypropylene also has a DSC melting point above the mixing temperature, preferably higher than about 140 degrees C. The density of the polypropylene can be in the range of 0.870 to about 0.915 gram per cubic centimeter, and is preferably in the range of 0.880 to 0.905 gram per cubic centimeter. The melt flow can be in the range of about 0.5 to about 20 decigrams per minute, and is preferably in the range of about 0.7 to about 10 decigrams per minute. Melt flow is determined in accordance with ASTM D-1238, Condition E, measured at 230° C., and is reported in decigrams per minute. Impact polypropylenes, random copolymers of propylene, and block copolymers of propylene can also be used, if desired. See, for example, U.S. Pat. No. 4,882,380.

Component (iv) is a silane coupling agent, which can include substituted alkoxy silanes such as vinyl-triethoxy-silane; phenyl-triethoxy-silane; methyl-triethoxy-silane; methyl-trimethoxy-silane; vinyl-trimethoxy-silane; gamma-vinyl-tris (2-methoxyethoxy)-silane; (methacryloxypropyl-trimethoxy-silane; gamma-methacryloxypropyl-tris (2-methoxyethoxy)-silane; beta-(3,4-epoxycylohexyl) ethyl-trimethoxy-silane; gamma-glycidoxypropyl-trimethoxy-silane; gamma-mercaptopropyl-trimethoxy-silane; gamma-aminopropyl-triethoxy silane; N-beta-aminoethyl-gamma-aminopropyl-trimethoxy-silane; and gamma-ureidopropyl-triethoxy-silane. There are preferably one or two alkoxy groups in each silane, and each alkoxy group preferably has 1 or 2 carbon atoms.

For each 100 parts by weight of component (i), the following components are present in the mixture of step (a) in parts by weight:

| component | broad | preferred |
|---|---|---|
| (ii) | about 30 to about 200 | about 80 to about 150 |
| (iii) | about 2 to about 50 | about 17 to about 35 |
| (iv) | about 0.1 to about 2 | about 0.6 to about 1.5 |

The mixture of components (i) to (iv) is thoroughly mixed (or kneaded) in a conventional mixer or kneader such as a V-blender, a ribbon blender, a Henschel™ mixer, a Banbury™ mixer, a Brabender™ mixer, or a tumbler, or an extruder adapted for mixing at a temperature in the range of about 120 to about 130 degrees C., and the resulting mixture is then thoroughly mixed in the same temperature range with a chemical blowing agent having a decomposition temperature lower than the mixing temperature. The amount of chemical blowing agent can be in the range of about 0.5 to about 3 parts by weight per 100 parts by weight of the mixture of components (i) to (iv), and is preferably mixed in an amount of about 1 to about 2.5 parts by weight. The conditions are preferably such that the resulting mixture does not expand more than 5 percent by volume. In this specification, mixing and kneading are synonymous.

Chemical blowing agents, which can be used, include p,p'-oxy-bis-benzenesulfonyl hydrazide (hereinafter referred to as OBSH); azo-di-carbonamide (hereafter referred to as ADCA); and mixtures thereof. Where two blowing agents are used, the ratio, by weight, can be in the range of about 6:1 to about 1:6, and is preferably about 3:1 to about 1:3. The chemical blowing agents are preferably treated with chemical blowing aids. In any case, the chemical blowing agents desirably decompose in the range of about 130 to about 200 degrees C., and generate an inert gas such as nitrogen. Their decomposition temperature should be such that they do not decompose during step (b) of the mixing process.

Blowing agent aids useful in the present invention include salicylic acid, stearic acid, phthalic acid, zinc stearate, lead stearate, magnesium stearate, calcium stearate, ethylene glycol, glycerol, ethanolamine, urea, various urea derivatives, melanin, dibasic lead phosphite, tribasic lead sulfate, and zinc oxide. The quantity of the blowing agent aid can be about 0.0003 to about 0.6 part by weight per 1 part by weight of chemical blowing agent. The chemical blowing agent and the blowing agent aid are blended at temperatures below the decomposition temperature of the blowing agent. The blending temperature can be in the range of about 20 to about 120 degrees C., and is preferably in the range of about 30 to about 80 degrees C. The expandable resin composition is then introduced into an extruder adapted for expanding (foaming or blowing) the resin composition at a temperature above its decomposition temperature, generally in the range of about 130 to about 200 degrees C. At about the same time, usually simultaneously with the introduction of the resin composition, an inert gas such as nitrogen is introduced into the extruder in an amount of about 0.01 to about 2 parts by weight of inert gas per 100 parts by weight of resin composition. Also, at about the same time, an electrical conductor or communications medium, or a core containing two or more of same is introduced into the same extruder, and it is coated in the extruder with the expandable resin composition. The combination of decomposed chemical blowing agent and nitrogen serves to expand the resin composition in the extruder or thereafter in air. Water can be used as a coolant to solidify the coating on, for example, wire, glass fiber, or a core containing either. It is found that the coating expands by at least about 70 percent by volume, and often by at least about 80 percent by volume.

Various conventional additives can be added to the expandable resin composition prior to or during the mixing of the components, and prior to or during extrusion. The additives include antioxidants, ultraviolet absorbers or stabilizers, antistatic agents, pigments, dyes, nucleating agents, reinforcing fillers or polymer additives, resistivity modifiers such as carbon black, slip agents, plasticizers, processing aids, lubricants, viscosity control agents, tackifiers, anti-blocking agents, surfactants, extender oils, metal deactivators, voltage stabilizers, flame retardant fillers and additives, crosslinking boosters and catalysts, and smoke suppressants. Additives can be added in amounts ranging from less than about 0.1 to more than about 5 parts by weight for each 100 parts by weight of the resin. Fillers are generally added in larger amounts up to 200 parts by weight or more.

Examples of antioxidants are: hindered phenols such as tetrakis[methylene(3,5-di-tert-butyl-4-hydroxyhydrocinnamate)]-methane, bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline. Antioxidants can be used in amounts of about 0.1 to about 5 parts by weight per 100 parts by weight of resin.

The expandable resin composition can be mixed and the cable coated with expanded resin can be prepared in various types of extruders, some of which are described in U.S. Pat. Nos. 4,814,135; 4,857,600; 5,076,988; and 5,153,382. All types of single screw and twin screw extruders and polymer melt pumps and extrusion processes will generally be suitable in effecting the process of this invention as long as they are adapted for mixing or foaming. A typical extruder, commonly referred to as a fabrication extruder will have a solids feed hopper at its upstream end and a melt forming die at its downstream end. The hopper feeds unfluxed plastics into the feed section of a barrel containing the processing screw(s) that flux and ultimately pump the plastic melt through the forming die. At the downstream end, between the end of the screw and the die, there is often a screen pack and a die or breaker plate. Fabrication extruders typically accomplish the mechanisms of solids conveying and compression, plastics fluxing, melt mixing and melt pumping although some two stage configurations use a separate melt fed extruder or melt pump equipment for the melt pumping mechanism. Extruder barrels are equipped with barrel heating and cooling features for startup and improved steady state temperature control. Modern equipment usually incorporates multiple heating/cooling zones starting at the rear feed zone and segmenting the barrel and downstream shaping die. The length to diameter ratio of each barrel is in the range of about 15:1 to about 30:1.

The expanded resin composition is useful in combination with electrical conductors comprised of metal such as copper or of carbon, or with communications media such as glass or plastic filaments used, for example in fiber optics applications.

This specification is based on Japanese patent application 07-226118 filed in Japan on Aug. 11, 1995 (applicant: Nippon Unicar Company Limited; inventors: Sakamoto et al) for which priority is claimed.

The patents and application mentioned in this specification are incorporated by reference herein.

The invention is illustrated by the following examples.

EXAMPLE 1

A long branched chain low density homopolymer of ethylene in an amount of 100 parts by weight, produced by a high pressure process, and having a melt index of 2.3 grams per 10 minutes, a density of 0.918 gram per cubic centimeter, and a swelling ratio of 54 percent by volume; a high density polyethylene in an amount of 80 parts by weight having a melting point of 133 degrees C., a density of 0.958 gram per cubic centimeter, a swelling ratio of 48 percent by volume, and a melt index of 3.5 grams per 10 minutes; polypropylene in an amount of 5 parts by weight, having a melting point of 155 degrees C., a density of 0.90 gram per cubic centimeter, and a melt flow rate of 3 grams per 10 minutes; vinyl triethoxy silane as a coupling agent in an amount of 0.2 part by weight; and an antioxidant (butylated hydroxytoluene) in an amount of 0.3 part by weight are blended and kneaded in a Banbury™ mixer at 140 degrees C. for 10 minutes to give a resin composition having a melting point of 124 degrees C.

OBSH in an amount of 1.5 parts by weight is added to 100 parts by weight of the above resin composition, and the mixture is kneaded in a Banbury™ mixer at 127 degrees C. for 10 minutes, and pressed to form a sheet having a preliminary expansion of 4 percent by volume. The sheet is cut by a sheet cutter into pellets, having a thickness of 3 millimeters, a length of 5 millimeters, and a width of 4 millimeters. These pellets are fed into a 50 millimeter extruder having a length to diameter ratio of 28, and the temperature is set at 132 degrees C. for the feeding zone, 142 degrees C. for the compression zone, and 148 degrees C. for the metering zone. Nitrogen, 0.8 part by weight per 100 parts by weight of the resin composition, is injected into the feeding zone, and the resin composition is kneaded so that nitrogen will be sufficiently dispersed. A 1.8 millimeter copper core wire is preheated to 50 degrees C., and is fed into the extruder and coated with the resin composition at a winding speed of 20 meters per minute. An expanded uniaxial cable having an external diameter of 10 millimeters is obtained.

The obtained resin product has an expansion of 78.5 percent by volume, and the cells have a diameter of 80 to 130 microns. A specimen of the uniaxial cable, 20 millimeters long, is prepared, and is compressed in the direction of the diameter at 10 millimeters per minute. The Young's modulus calculated from the stress vs. stress relationship is 0.75 kilogram per square millimeter. This meets the requirement for the mechanical property. The capacitance measured is 48 nF/Km, which meets the requirement for the electrical property.

COMPARATIVE EXAMPLES 1 to 12

Comparative Example 1

Example 1 is repeated except that the high density polyethylene is present in an amount of 20 parts by weight. It is found that the Young's modulus is 0.68 kilogram per square millimeter, which does not meet the requirement of the present invention.

Comparative Example 2

Example 1 is repeated except that the high density polyethylene is present in an amount of 220 parts by weight carried out. It is found that the preliminary expansion of 5 percent by volume or lower could not be attained. It is also found that the final expansion is 65 percent by volume. These results do not meet the requirements of the present invention.

Comparative Example 3

Example 1 is repeated except that the polypropylene is present in an amount of 1 part by weight. It is found that the final expansion is 67 percent by volume, which did not meet the requirement of the present invention.

Comparative Example 4

Example 1 is repeated except that the polypropylene is present in an amount of 60 parts by weight. It is found that the cell structure is not uniform, and that the electrical property does not meet the requirement of the present invention.

Comparative Example 5

Example 1 is repeated except that the silane coupling agent is present in an amount of 0.05 part by weight. It is found that the cell structure is not uniform, and that the electrical property does not meet the requirement of the present invention.

Comparative Example 6

Example 1 is repeated except that the silane coupling agent is present in an amount of 2.2 parts by weight. It is found that the inductance is higher than the requirement of the present invention.

Comparative Example 7

Example 1 is repeated except that the chemical blowing agent is present in an amount of 0.3 part by weight. It is found that the final expansion is 68 percent by volume, which is lower than the requirement of the present invention.

Comparative Example 8

Example 1 is repeated except that the chemical blowing agent is present in an amount of 3.5 parts by weight. It is found that the product is over blown resulting in a poor electrical property that does not meet the requirement of the present invention.

Comparative Example 9

Example 1 is repeated except that the chemical blowing agent is blended into the resin composition at 118 degrees C. It is found that the dispersion is inadequate resulting in a final expansion and mechanical and electrical properties, which do not meet the requirements of the present invention.

Comparative Example 10

Example 1 is repeated except that the chemical blowing agent is blended into the resin composition at 133 degrees C. It is found that the preliminary expansion is 8 percent by volume, and the final expansion is lower than in example 1. The product does not meet the requirement of the present invention.

Comparative Example 11

Example 1 is repeated except that the nitrogen is present in an amount of 0.008 part by weight. It is found that the final expansion decreases to 68 percent by volume, which does not meet the requirement of the present invention.

Comparative Example 12

Example 1 is repeated except that the nitrogen is present in an amount of 2.2 parts by weight. It is found that the final expansion increases to 82 percent by volume resulting in an uneven cell structure, and that the electrical and mechanical properties do not meet the requirements of the present invention.

EXAMPLE 2

A long branched chain, low density polyethylene in an amount of 100 parts by weight, produced by a high-pressure process, having a melt index of 1.5 grams per 10 minutes, a density of 0.921 gram per cubic centimeter, and a swelling ratio of 52 percent by volume; a high-density polyethylene in an amount of 87 parts by weight, having a melting point of 135 degrees C., a density of 0.960 gram per cubic centimeter, a swelling ratio of 48 percent by volume, and a melt index of 2.5 grams per 10 minutes; polypropylene in an amount of 5.5 parts by weight having a melting point of 160 degrees C., a density of 0.91 gram per cubic centimeter, and a melt flow rate of 2 grams per 10 minutes; methyl triethoxysilane as a coupling agent in an amount of 0.4 part by weight; and an antioxidant (butylated hydroxytoluene) in an amount of 0.3 part by weight are blended at 150 degrees C. for 10 minutes in a Banbury™ mixer. A resin composition having a melting point of 126 degrees C. is obtained.

To 100 parts by weight of the above resin composition, 0.7 part by weight of OBSH as well as 0.8 part by weight of ADCA treated with 0.5 part by weight of urea are added, and the mixture is kneaded in a Banbury™ mixer at 128 degrees C. for 10 minutes. A 5 percent by volume pre-expanded sheet is pressed from this composition. The sheet is cut, using a sheet cutter, into pellets having a thickness of 3 millimeters, a length of 5 millimeters, and a width of 4 millimeters. Then, the pellets are fed into a 50 millimeter extruder having a length to diameter ratio of 28, and the cylinder temperature is set to 134 degrees C. for the feeding zone, 145 degrees C. for the compression zone, and 151 degrees C. for the metering zone. The blowing gas (nitrogen), 1.0 part by weight per 100 parts by weight of the resin composition, is injected into the feeding zone, and the mixture is sufficiently kneaded to uniformly disperse the gas into the composition. A copper core wire having a diameter of 1.8 millimeter is preheated to 50 degrees C. and then fed into the extruder where it is coated with the resin composition at a winding speed of 20 meters per minute to form a uniaxial cable core insulated with an expanded resin composition.

The expanded product thus obtained has an expansion of 79.7 percent by volume and a cell diameter of 80 to 130 microns. A specimen of the uniaxial cable core, 20 millimeters in length, is prepared, and compressed in the direction of the diameter at a rate of 10 millimeters per minute. The Young's modulus, 0.82 kilogram per square millimeter, calculated from the stress vs. strain relationship, meets the requirement of mechanical strength. The capacitance is 46.5 nF/Km, which meets the electrical requirement of the present invention.

We claim:

1. A process for preparing an expandable resin composition comprising the following steps:
    (a) admixing, at a temperature in the range of about 120 to about 130 degrees C., the following components:
        (i) 100 parts by weight of a high pressure, low density homopolymer of ethylene;
        (ii) about 30 to about 200 parts by weight of a high density polyethylene having a melting point higher than the above mixing temperature;
        (iii) about 2 to about 50 parts by weight of polypropylene having a DSC melting point of not less than about 140 degrees C. and a melt flow in the range of about 0.5 to about 20 decigrams per 1 minute; and
        (iv) about 0.1 to about 2 parts by weight of a silane coupling agent; and (b) admixing, at a temperature in the range of about 120 to about 130 degrees C., 100 parts by weight of the mixture produced in step (a) with 0.5 to 3 parts by weight of one or more chemical blowing agents having a decomposition temperature higher than the above mixing temperature.

2. The process defined in claim 1 wherein component (i) has a density in the range of 0.915 to 0.930 gram per cubic centimeter and a melt index in the range of about 1 to about 10 grams per 10 minutes; component (ii) has a density in the range of 0.945 to 0.961 gram per cubic centimeter and a melt index in the range of about 15 to about 20 grams per 10 minutes; component (iii) has a density in the range of 0.870 to 0.915 gram per cubic centimeter; component (iv) is a substituted alkoxy silane; the chemical blowing agent(s), optionally, contain a chemical blowing aid; and the mixture of step (b) expands no more than about 5 percent by volume.

3. The process defined in claim 1 wherein component (ii) is present in an amount of about 80 to 150 parts by weight; component (iii) is present in an amount of about 17 to about 35 parts by weight; component (iv) is present in an amount of about 0.6 to about 1.5 parts by weight; and the chemical blowing agent(s) are present in an amount of about I to about 2.5 parts by weight.

4. A process for preparing a cable comprising the following steps:

(a) introducing into an extruder, adapted for expanding a resin, 100 parts by weight of the expandable resin composition prepared in claim 1;

(b) introducing into said extruder one electrical conductor or communications medium or a core of two or more electrical conductors or communications media;

(c) introducing into said extruder about 0.01 to about 2 parts by weight of an inert gas; and (d) extruding the expandable resin composition of step (a) around the conductor, medium, or core of step (b) at a temperature above the decomposition temperature of the chemical blowing agent(s) wherein the resin composition of step (a) expands at least about 70 percent by volume to provide an expanded layer around the conductor, medium, or core of step (b).

5. A process for preparing a cable comprising the following steps:

(a) admixing, at a temperature in the range of about 120 to about 130 degrees C., the following components:

(i) 100 parts by weight of a high pressure, low density homopolymer of ethylene;

(ii) about 30 to about 200 parts by weight of a high density polyethylene having a melting point higher than the above mixing temperature;

(iii) about 2 to about 50 parts by weight of polypropylene having a DSC melting point of not less than about 140 degrees C. and a melt flow in the range of about 0.5 to about 20 decigrams per 1 minute; and (iv) about 0.1 to about 2 parts by weight of a silane coupling agent; and (b) admixing, at a temperature in the range of about 120 to about 130 degrees C., 100 parts by weight of the mixture produced in step (a) with 0.5 to 3 parts by weight of one or more chemical blowing agents having a decomposition temperature higher than the above mixing temperature (c) introducing into an extruder, adapted for expanding a resin, 100 parts by weight of the expandable resin composition prepared in step (b);

(d) introducing into said extruder one electrical conductor or communications medium or a core of two or more electrical conductors or communications media;

(e) introducing into said extruder about 0.01 to about 2 parts by weight of an inert gas; and (f) extruding the expandable resin composition of step (c) around the conductor, medium, or core of step (d) at a temperature above the decomposition temperature of the chemical blowing agent(s) wherein the resin composition of step (c) expands at least about 70 percent by volume to provide an expanded layer around the conductor, medium, or core of step (d).

6. The process defined in claim 5 wherein component (i) has a density in the range of 0.915 to 0.930 gram per cubic centimeter and a melt index in the range of about 1 to about 10 grams per 10 minutes; component (ii) has a density in the range of 0.945 to 0.961 gram per cubic centimeter and a melt index in the range of about 15 to about 20 grams per 10 minutes; component (iii) has a density in the range of 0.870 to 0.915 gram per cubic centimeter; component (iv) is a substituted alkoxy silane; the chemical blowing agent(s), optionally, contain a chemical blowing aid; and the mixture of step (b) expands no more than about 5 percent by volume.

7. The process defined in claim 5 wherein component (ii) is present in an amount of about 80 to 150 parts by weight; component (iii) is present in an amount of about 17 to about 35 parts by weight; component (iv) is present in an amount of about 0.6 to about 1.5 parts by weight; and the chemical blowing agent(s) are present in an amount of about 1 to about 2.5 parts by weight.

* * * * *